T. J. KEHOE.
CONVERTIBLE VEHICLE BODY.
APPLICATION FILED FEB. 12, 1917.
1,379,825.
Patented May 31, 1921.
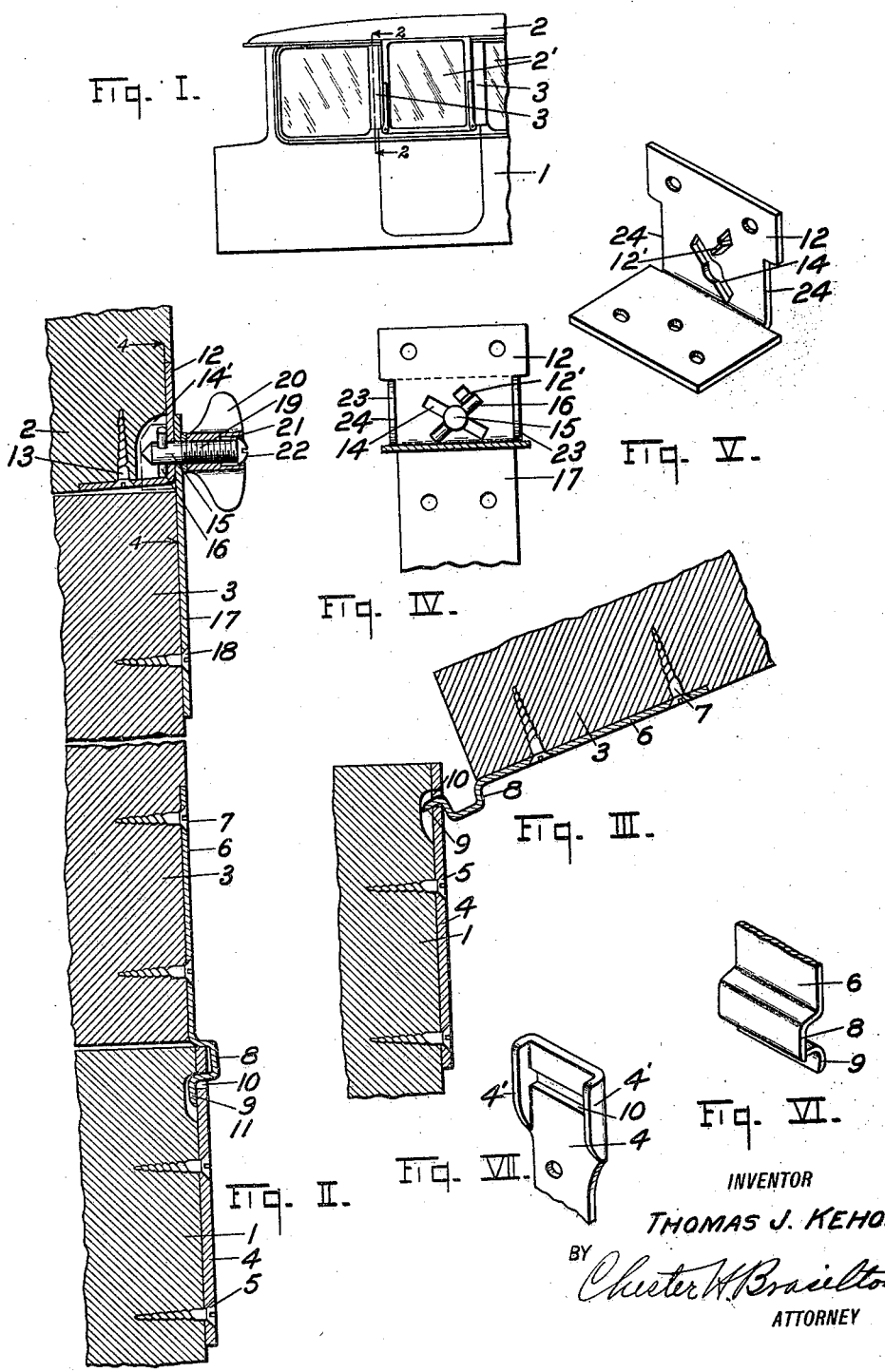
INVENTOR
THOMAS J. KEHOE
BY Chester H Brazelton
ATTORNEY

UNITED STATES PATENT OFFICE.

THOMAS J. KEHOE, OF TOLEDO, OHIO, ASSIGNOR TO THE WILLYS-OVERLAND COMPANY, OF TOLEDO, OHIO, A CORPORATION OF OHIO.

CONVERTIBLE VEHICLE-BODY.

1,379,825. Specification of Letters Patent. Patented May 31, 1921.

Application filed February 12, 1917. Serial No. 148,127.

*To all whom it may concern:*

Be it known that I, THOMAS J. KEHOE, a citizen of the United States, residing at Toledo, county of Lucas, State of Ohio, have invented new and useful Improvements in Convertible Vehicle-Bodies, of which the following is a specification.

This invention relates to convertible tops for motor vehicles, and more particularly to the joint connections and separable locking means for the demountable pillars therefor.

The principal object of this invention is to provide a separable joint connection and locking means, for demountable or detachable pillars, of such a nature as to secure the same under tension. Another object is to provide separable clamping and locking means whereby the pillar may be secured to the body and the permanent top member quickly and securely, and held under sufficient tension to eliminate any vibration or rattle of the pillar. Another object is to provide a separable joint connection whereby the pillar may be removed without adjusting the same to any particular angle of position for removing the same.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing, forming a part of this specification in which:

Figure 1 is a fragmentary side elevation of a motor vehicle in which a preferred form of my invention is embodied.

Fig. 2 is an enlarged fragmentary, sectional view, taken substantially on line 2—2 of Fig. 1, showing the joint connection and separable locking means at the ends of the pillar.

Fig. 3 is a sectional view, similar to Fig. 2, showing the pillar in position to be removed;

Fig. 4 is a rear elevation of the separable locking means taken substantially on line 4—4 of Fig. 2;

Fig. 5 is a detail perspective view of the angle bracket forming the keeper member of the separable locking means;

Fig. 6 is a perspective view of the tongue portion of the joint connection;

Fig. 7 is a perspective view of the slotted portion of the joint connection.

In the drawings, similar reference characters refer to similar parts throughout the several views and the sectional views are taken looking in the direction of the little arrows at the ends of the section lines.

Considering the numbered parts of the drawings, 1 represents the body of a motor vehicle, and 2 the permanent top. The removable or demountable pillars 3 are detachably connected at their ends to the body 1 and the permanent top 2, respectively, and said pillars serve as guides for the edges of the windows 2' as shown in Fig. 1. When it is desired to convert the vehicle shown in Fig. 1 into a vehicle of the open type, the windows 2' are lowered into the body and the pillars are disconnected from the top and body, respectively, and are entirely removed. A plate 4 is secured to the body 1 by screws 5, and inturned lugs 4'. A relatively thin plate 6 is secured to the lower end of the demountable pillar 3 by screws 7. The plate 6 has an offset portion 8 and a tongue portion 9 adapted to be slipped through the slot 10 of the plate 4 and held against the inner side of said plate. The body 1 is recessed at 11 to accommodate the tongue portion 9.

An angle bracket 12 is secured to the inner face and underside of the permanent top member 2 by screws 13 and is provided with a slot 14 to admit the end of the clamping bolt 15 and transverse pin 16. The top member 2 is provided with a recess 14' to give clearance for the end of the clamping bolt 15. A plate 17 is secured to the upper end of the demountable pillar by screws 18 and supports the clamping bolt 15. The threaded end 19 of the clamping bolt 15 is adapted to be engaged by the winged nut 20. The winged nut 20 is counterbored at 21 to receive the head of the bolt 22 as clearly appears in Fig. 2. A tongue 12' is struck up on the inner face of the angle bracket 12 to limit the movement of the pin 16. It will be seen that as the winged nut 20 is unscrewed on the clamping bolt 15, that its movement will be limited by the bolt 22, thus preventing the parts from becoming entirely disengaged from each other. To relieve any side strain and to properly center the clamping bolt 15, with reference to the slot 14, I provide inturned lugs 23 on the upper edges of the plate 17, which engage the recesses 24 in the angle plate 12 when the parts are in locking engagement.

The face of the tongue portion 9 extends at a slight angle to the plate 6, and as this tongue portion 9 is slipped through the slot 10 of the plate 4, the lower end of the tongue engages the inner side of the plate 4. The offset portion 8 of the plate 6 engages the upper edge of the plate 4 and the pillar is drawn into locked position by the separable locking means at the upper end thereof. The face of the tongue 9 is brought into parallel relation with the plate 6, such movement being opposed by the resiliency of the tongue, and the pillar when locked in place is thus held under tension, thus holding all of the parts rigidly and securely, and preventing the pillar from working loose and rattling.

To lock the pillar in position I provide a clamping bolt 15 loosely mounted in the plate 17 at the upper end of the demountable pillar 3, the clamping bolt 15 being provided with the transverse pin 16 which is adapted to pass through slot 14 in the angle bracket 12, and as the wing nut 20 is turned to draw the parts together the clamping bolt 15 will turn with the wing nut 20 until one end of said pin 16 strikes the angle bracket, and the other end of the pin 16 strikes the struck up tongue 12' thus preventing the separation of the parts of the locking member, as clearly appears in Fig. 4. Further turning of the nut 20 on the bolt 15 will draw the parts into closer engagement and secure the pillar in place under tension as heretofore described. When it is desired to remove the pillar, the nut 20 may be loosened, the pin 16 turning with the bolt 15 until it registers with the slot 14 in the angle bracket 12, the pin 16 may then be passed through the slot 14 and the pillar swung to about the position shown in Fig. 3, in which position the tongue portion 9 may be withdrawn from the slot 10 and the pillar entirely removed and stored wherever desired.

I am aware that the embodiment of my invention here shown and described is susceptible of considerable variation without departing from the spirit and scope thereof and, therefore, I desire to claim the same broadly as indicated by the appended claims. I have found, however, that this particular embodiment is desirable from many standpoints and, therefore, I desire to claim the same specifically as well as broadly as will appear from the appended claims.

Having thus described my invention, what I claim as new and desire to secure by Letters Patent is:

1. In a motor vehicle, the combination of a body, a permanent top, a removable pillar and means for detachably connecting said pillar at top and bottom to said top and said body respectively comprising a slotted plate secured to said body, a plate secured to the lower end of said pillar and provided with a tongue extending at a slight angle to the plane of said plate, and an offset portion connecting said tongue with said plate, said tongue being adapted to enter said slot and engage the inner face of said slotted plate, a bracket secured to said top and provided with a slot, a plate secured to the upper end of said pillar, a clamping bolt loosely mounted in the upper end of said plate, a pin extending transversely from the inner end of said bolt and adapted to pass through said slot and a nut threaded on the outer end of said bolt and adapted to draw said pillar to position and to hold it there under tension.

2. In a motor vehicle, the combination of a body, a permanent top, a removable pillar and means for detachably connecting said pillar at top and bottom to said top and said body respectively comprising a slotted plate secured to said body, a plate secured to the lower end of said pillar and provided with a tongue extending at a slight angle to the plane of said plate, and an offset portion connecting said tongue with said plate, said tongue being shaped to enter said slot and engage the inner face of said slotted plate, a keeper carried by said top and locking or clamping means carried by the upper end of said pillar and detachably engaging said keeper member to draw said pillar to position and to hold it there under tension.

3. In a motor vehicle, the combination of a body, a permanent top, a removable pillar and means for detachably connecting said pillar at top and bottom to said top and said body respectively comprising a slotted plate secured to said body, a plate secured to the lower end of said pillar and provided with a tongue extending at a slight angle to the plane of said plate, said tongue being adapted to enter said slot and engage the inner face of said slotted plate, a keeper member carried by said top and locking or clamping means carried by the upper end of said pillar and detachably engaging said keeper member to draw said pillar to position and to hold it there under tension.

4. In a motor vehicle, the combination of a body, a permanent top, a removable pillar and means for detachably connecting said pillar at top and bottom to said top and said body respectively comprising a detachable joint connection between the lower end of said pillar and said body, said connection normally supporting said pillar slightly out of line with the plane of said top and yielding to permit the pillar to be drawn into and held in position in said plane under tension, and separable locking or clamping means connecting the upper end of said pillar to said top and adapted to draw said pillar to position and to hold it there under tension.

5. In a vehicle, the combination with a body provided with a top, of a removable pillar extending between said body and said top; a detachable resilient joint connection between said body and the lower end of said pillar, normally supporting said pillar out of line with said body; and a separable locking device connecting the top of said pillar and said top, and operable to draw said pillar into line with said body and hold it there against the resiliency of said detachable joint connection.

6. In a vehicle, the combination with a body provided with a top, of a removable pillar extending between said body and said top, a detachable tongue and slot connection between said pillar and one of said parts, said tongue being resilient and being put under tension when said pillar is moved into operative position, and a separable locking device connecting the other end of said pillar with the other of said parts.

In witness whereof I affix my signature.

THOMAS J. KEHOE.